United States Patent [19]

Ainslie et al.

[11] Patent Number: 4,789,914
[45] Date of Patent: Dec. 6, 1988

[54] THIN FILM MAGNETIC READ-WRITE HEAD/ARM ASSEMBLIES

[75] Inventors: Norman G. Ainslie, Croton-on-Hudson; Vlasta A. Brusic, Amawalk, both of N.Y.; Daniel W. Chapman, San Jose, Calif.; Lubomyr T. Romankiw, Briarcliff Manor, N.Y.; Richard K. Wilmer, San Jose, Calif.

[73] Assignee: International Business Machines Corporation, Armonk, N.Y.

[21] Appl. No.: 923,942

[22] Filed: Oct. 28, 1986

[51] Int. Cl.⁴ ............................................. G11B 5/48
[52] U.S. Cl. .................................... 360/103; 360/104
[58] Field of Search .............................. 360/103–104

[56] References Cited

U.S. PATENT DOCUMENTS 3,564,522  2/1971  Stevens .......................... 340/174.1
4,219,853  8/1980  Albert et al. ....................... 360/103

FOREIGN PATENT DOCUMENTS 52-8813   1/1977  Japan .
53-30310  3/1978  Japan ................................. 360/104
53-69623  6/1978  Japan .
53-74414  7/1978  Japan .
58-77016  5/1983  Japan .

OTHER PUBLICATIONS

Warwick, "Multilayer Ceramic Slider for Thin Film Heads", IBM Technical Disclosure Bulletin, vol. 15, No. 7, 2/72-pp. 2183–2184.

Reidenbach, "Combination Suspension-Lead Cable for a Multi-Gap Read/Write Head", IBM Technical Disclosure Bulletin, vol. 22, No. 4, 9/79, pp. 1602–1603.

Church et al, "Method for Wiring a Magnetic Head", IBM Technical Disclosure Bulletin, vol. 23, No. 8, 1/81, pp. 3873–3874.

Chase et al, "Semiconductor Solder Reflow Chip Substrate Joinint," IBM Tech. Discl. Bulletin, vol. 16, No. 8, 1/74, p. 2675.

Watrous, "Magnetic Head Suspension Assembly", IBM Tech. Discl. Bulletin, vol. 24, No. 10, 3/82, p. 4915.

*Primary Examiner*—A. J. Heinz
*Attorney, Agent, or Firm*—Alexander Tognino; Philip J. Feig

[57] ABSTRACT

A thin film magnetic read/write head/arm assembly and method of manufacturing the same is disclosed herein. Contact soldering of the opposite to disk side of the read/write head to a cable in laminate relationship to the suspension arm, or a polyimide strip with conductors deposited thereon provides both electrical interconnection and mechanical support. Semiconductor devices can also be intermediately soldered between the head and cable for maximum noise suppression.

3 Claims, 7 Drawing Sheets

THIN FILM MAGNETIC READ-WRITE HEAD/ARM ASSEMBLIES

BACKGROUND OF THE INVENTION

1. Field of the Invention

This invention relates to an improved method of assembling a thin film magnetic head to a suspension arm assembly. More particularly, this invention relates to a method of assembling a thin film magnetic head/slider to a suspension arm by contact soldering of said magnetic head/slider to said suspension arm for the purpose of simultaneously affixing the said head/slider to the said suspension arm while also establishing electrical contact to the head/slider.

2. Description of Related Art

The demand for increased data capacity coupled with market pressure for the reduction in the cost of said data storage capacity has created an ever increasing demand for more production efficient and less complex methods of assembling magnetic disk storage equipment.

One area of specific consideration has been, the speed with which a particular section of a magnetic disk can be accessed. In order to decrease this access time, the use of more than one read/write head on a single arm with multiple suspensions are being designed and used. However, while faster access times have been able to be achieved, current manufacturing techniques have not kept pace with these other developments. For instance, multi-head suspension arm assemblies are currently being assembled using single slider, single head assembly techniques. The expanded use of these single slider, single head assembly techniques has yielded a production system which is largely manual, requires excessive fixturing and furnaces, and uses tedious, partly manual wire bonding techniques.

For example, FIG. 1 shows a typical head/suspension arm assembly as known in the prior art. From the FIGURE it can be readily seen that the head assembly 9 is mechanically attached to a flexure support 7 of the suspension 5. Electrical connection 15 is made to the head assembly 9 by wire bonding of the twisted pair wiring 13. Mechanical and electrical connection are thus two separate assembly operations requiring separate, and numerous process steps.

A basic limiting factor of the presently known head/suspension assembly has been the skill in the art for manufacturing the thin film magnetic read/write head and slider assemblies. As has been known in the art for several years, thin film conductors are deposited as a spiral on the face of a ceramic substrate and have replaced the coil of wound wires as part of an inductive circuit for the magnetic read/write transducer. The spiral is arranged such that it is positioned in one of the rails of the slider with the electromagnetic head positioned on the trailing edge of the slider structure. While wire bonding has replaced soldering for connecting the electromagnetic head to the controller circuitry, the wires must still be assembled and laced across the suspension arm. The assembly operations are still time consuming and largely manual.

While there have been various modifications in the art for suspending the head from the suspension arm, these modifications have been concerned with flying height stability and flexure. Affixation of the head to the arm has primarily been achieved by epoxying the top of the slider to the bottom of the suspension. The epoxy is applied to the slide side facing the suspension so as to get a strong physical bond to the suspension. The side to which epoxy is applied is opposite to the side facing the disk (otherwise herein as slider top). Because of head and suspension arm joining techniques, peripheral support electronics, such as noise suppression hardware, and pre-amplifiers have always had to be located remotely from the magnetic transducer and the slider. Such methods of assembly are costly and do not maximize signal and minimize noise. It is therefore an object of the present invention to provide a novel and automatable means of joining a thin film read/write magnetic head and head slider to the suspension to provide mechanical and electrical connection between slider top and suspension in one soldering operation.

SUMMARY OF THE INVENTION

A thin film magnetic read/write head/slider joined to a suspension arm assembly is disclosed wherein solder assembly of said read/write head/slider to a thin cable interface on the suspension arm provides both mechanical support and electrical interconnection of said read/write head/slider to said suspension arm and to external circuitry.

The thin film head/slider is of a special design such that the heretofore known wiring bonding interfaces located on the traililng edge of said slider are now positioned on the opposite to disk side of the slide (top side of the slider). In addition, the head/slider to suspension arm connection now provides a contact interface for other semiconductor devices to be positioned directly on said head/slider. Associated semiconductor devices can be either joined to the thin cable interface prior to the solder joining of said suspension arm to the head/slider, or can be joined at the same time. The devices can also be joined to the slider directly or to a multilayer ceramic or silicon or any other material carrier or interposer which withstands soldering temperature interposer placed between the slider and device.

The foregoing and other objects, features and advantages of the invention will be apparent from the following more particular description of the invention as illustrated in the accompanying drawings.

DETAILED DESCRIPTION OF THE INVENTION

To appreciate the principles of the configuration and construction of the head and suspension arm assembly according to this invention, it may be useful to review that assembly as known and used in the prior art.

Figure 1:
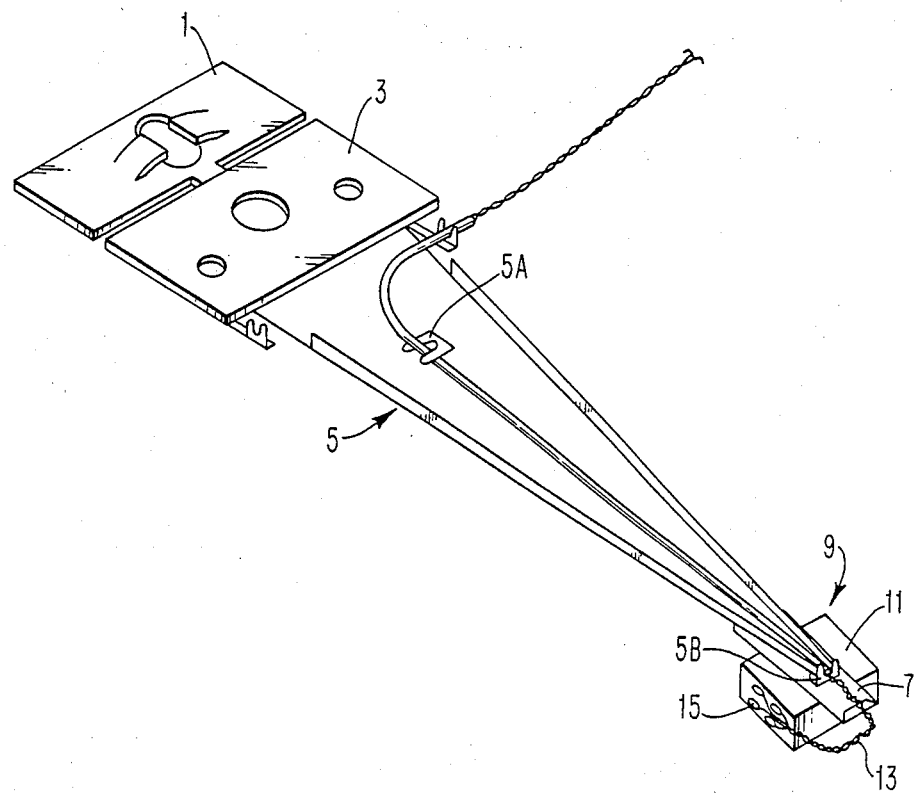
FIG. 1 is an exploded view of the several parts of the head and suspension arm assembly as currently known in the prior art.

Referring to FIG. 1, a suspension arm assembly 1 is shown. The assembly is divided into three parts: a mounting plate 3, a load beam 5 with flexure support 7 and a head/slider assembly 9.

The mounting plate 3 serves to mount the suspension assembly 1 onto arm platforms (not shown). It will be appreciated by those skilled in the art that the platforms can be either fixed or movable and control the locating of the head/slider combination over selected disk tracks.

Assembled to the mounting plate 3 is load beam 5 with flexure support 7. The load beam 5 serves to counterbalance and position the head/slider a predetermined distance above the disk. In addition, the load beam 5 includes crimp tab 5A and front support fork 5B which act as a guide for running the twisted pair wiring 13 from the computer circuitry (not shown) to the head/slider 11.

Opposite the mounting plate 3 and located on load beam 5 is flexure support 7. The flexure support 7 acts to counterbalance the aerodynamic forces set up by the slider 11 and provides support for said slider 11 which is epoxy bonded thereto. Further, the flexure support 7 also provides support and dresses the twisted pair wiring to the head/slider 11.

It should be recognized by those skilled in the art that head/slider 11 can be any currently practiced thin film magnetic read/write head/slider. The slider itself can include a variety of rail designs to provide the specific aerodynamic equilibrium desired.

Figure 2:
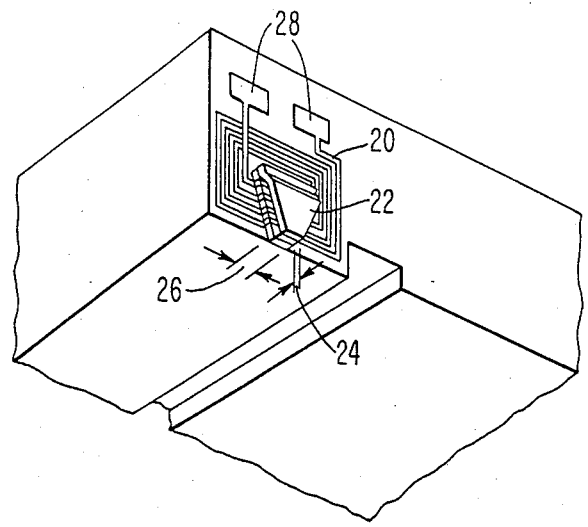
FIG. 2 is a perspective view of the trailing edge of a thin film slider with wiring contact pads as currently known in the art.

As shown in FIG. 2, the electromagnet for the head is comprised of a thin, pancake like, spiral film 20 electrical conductor deposited on the slider substrate. The magnetic yoke 22 of the head is typically permalloy: an alloy of nickel and iron and is designed to include a predetermined read/write gap (glass) 24 and data track width 26 to be compatible with the disk format. The read/write transducer is located at the trailing edge of the slider and has contact pads 28 located on said same trailing edge for electrical interconnection to the computer circuitry.

As will be appreciated by those skilled in the art, assembly of the above suspension arm with the head/slider attached thereto as practiced today is a very labor intensive and costly process requiring successive fixturing, aligning, and baking and bonding operations.

Having thus described the state of the art for suspension arm assemblies with the head/slider attached thereto, the invention claimed herein will now be described.

Figure 16:
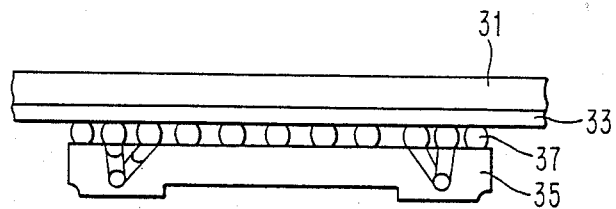
FIGS. 16–18 are side views of selected embodiments of the head joined to the suspension arm using the invention disclosed herein.

Referring now to FIG. 16, a cross-section of the embodiment of a head/slider attached to a suspension arm according to the subject invention is shown. As can be seen in the FIGURE, the flexure arm 31 is in a close and laminate relationship with cable 33.

It should be appreciated by those skilled in the art that the cables 33 are able to be affixed to the suspension arm by any number of means including but not limited to epoxying and/or mechanical retention and that any configuration of thin multiconductor cables can be substituted for the cables 33 as long as the laminate relationship with the flexure is maintained.

In another embodiment (not shown), the configuration of the suspension arm and cables can be replaced by an assembly using polyimide, such as the KAPTON brand of polyimide manufactured by DUPONT. With this arrangement the polyimide is used as the suspension arm and electrical conductors are then vapor deposited by conventional deposition process directly onto said polyimide material. Optionally, an additional layer of polyimide can be bonded over the portion of exposed conductors between the head/slider and mounting plate connections.

Returning now to FIG. 16, it can further be seen that suspended from and attached to cables 33, is the head/slider 35. The head/slider 35 joined to the cables 33 by solder connections 37 located entirely between the top and head/slider 35 and the cables 33. Solder connections 37 can be any type of known solid contact soldering including but not limited to copper ball soldering and/or controlled collapse Sn or Sn Pb soldering or metal alloys substituted therefore.

From the above assembly, it should be appreciated by those skilled in the art that the transducer bonding pads as known to be located in the prior art, have been replaced by solder contacts located on the opposite to disk side (top side) of the head/slider. The details of this unique head/slider combination 35 will be more readily understood from the following description of FIGS. 3–16.

Figure 3:
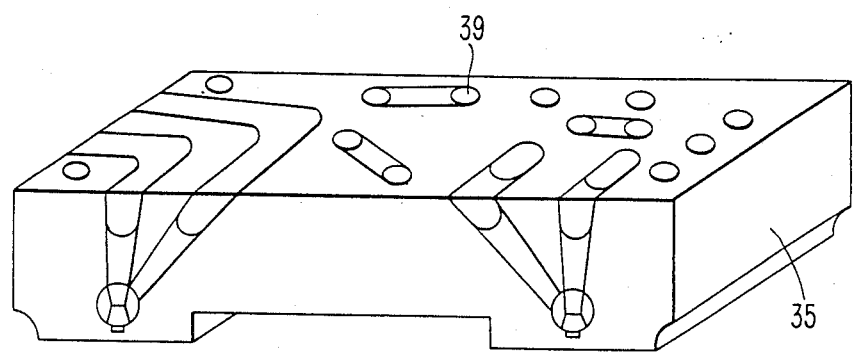
FIG. 3 is a perspective view of the trailing edge and the top side (opposite to disk side face), of the thin film magnetic head/slider according to the present invention.

From FIG. 3, it can be readily seen that the head/slider combination 35 has now be designed so that solder contact pads 39 have been created on the opposite to disk side of the head/slider (top side of the head/slider). These contact pads 39 have been specially processed to comprise a profile of first, a layer of chromium/copper for bonding to the aluminum oxide layer of the head/slider, with, next a layer copper deposited onto said first layer for solderability and wetting, and, then, a layer of solder is deposited in a pattern on the layer of copper to complete the pad. These layers will be more readily understood from the detailed description which follows. As embodied herein, lead/tin solder alloy with high lead concentrations was used but other alloys are feasible and in certain applications may be necessary for metallurgical compatibility.

The slider as illustrated in FIG. 3 and as described above can be fabricated by using the following process. For each of the FIGS. 4–15, identical numbering has been used to identify like components between the FIGURES.

Figure 4:
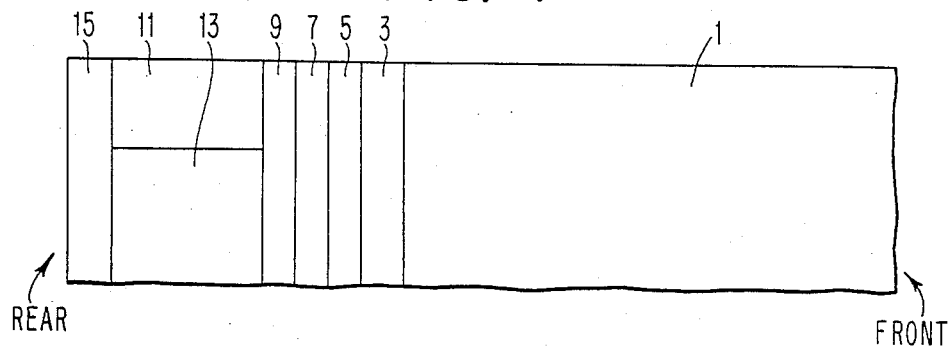
FIGS. 4–15 are trailing edge side views of the processing steps for the manufacture of the head/slider of this invention.

Referring now to FIG. 4, an exploded cross-section side view of the trailing edge of a thin film slider is shown, said slider having been processed through contact stud plating by those skills already known in the art. Briefly, as can be seen in the FIGURE, onto a slider substrate material 1, there has been deposited an aluminum oxide ($Al_2O_3$) layer 3. Onto said layer of aluminum oxide 3 is deposited successive layers of permalloy 5, copper 7, and permalloy lead 9; permalloy lead being the lead alloy of permalloy. Layered onto said permalloy layer 9 are copper studs 11 and aluminum oxide layer 13.

With the slide in the above state, a relatively thin blanket layer (0.5–2.0 micron) 15 of aluminum oxide or other suitable dielectric material is sputered or vacuum deposited thereon. The substrate (wafer) is then sliced into sliders and polished to yield the slider of FIG. 4.

Figure 5:
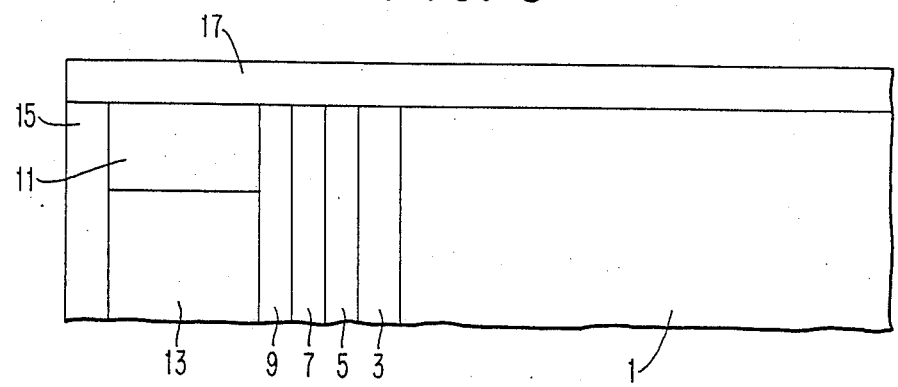
Figure 6:
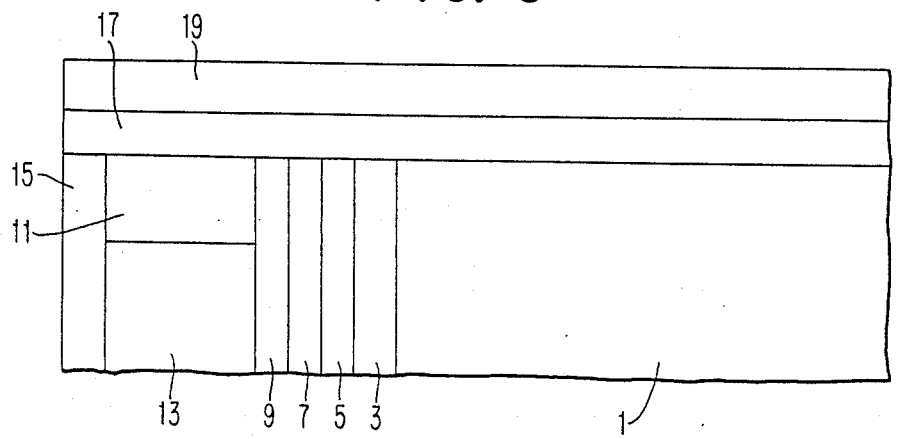
Figure 7:
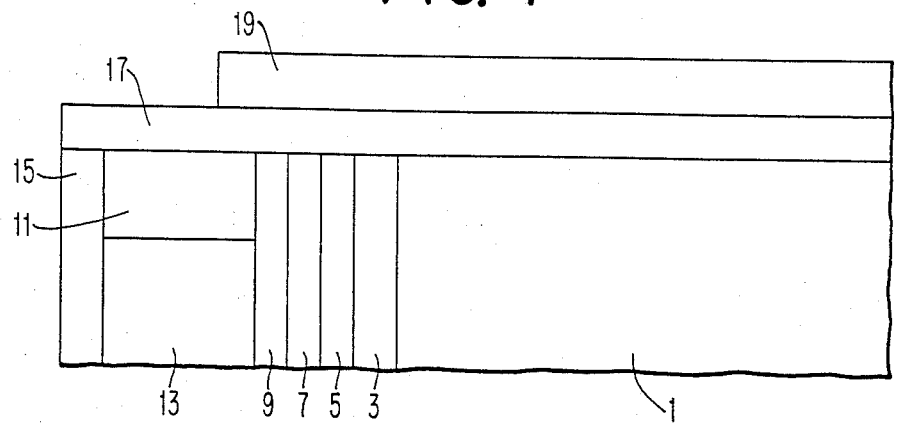
Figure 8:
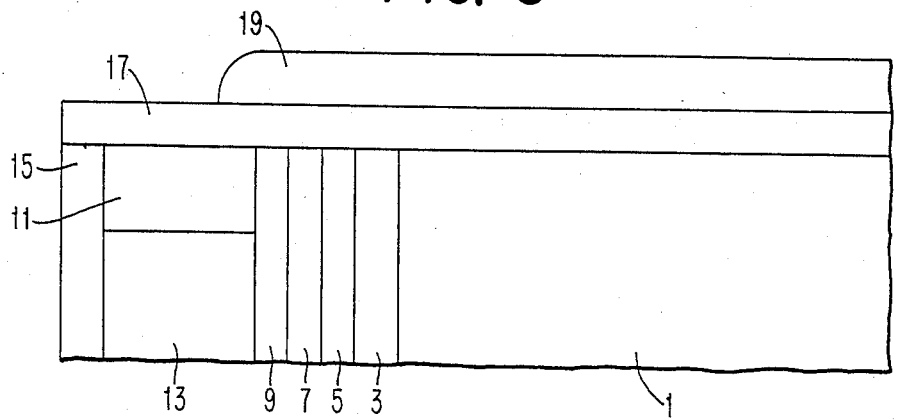

Next, a second blanket layer 17 of aluminum oxide, or other dielectric material, is then vacuum deposited onto the polished backside of the slider as shown in FIG. 5. Then, a layer of AZ resist 19 is spun onto the aluminum oxide layer 17 (FIG. 6) after suitable drying. Next, the resist is subsequently exposed and developed to uncover the aluminum oxide layer 17 immediately over the copper or gold studs 11 as shown in FIG. 7. The resist is then reflowed at approximately 100°–180° C. to create a smooth resist contour (FIG. 8); the reflow step being unnecessary should chemical etching of the aluminum oxide, rather than sputter etching be used in the following step.

Figure 9:
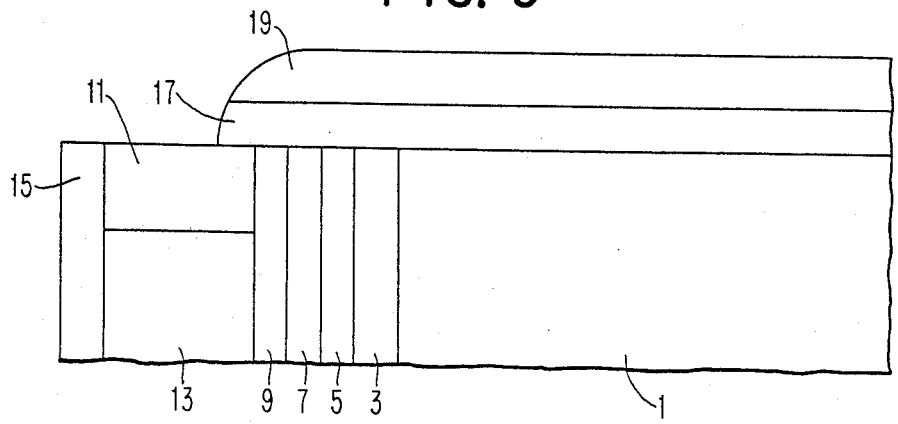
Figure 10:
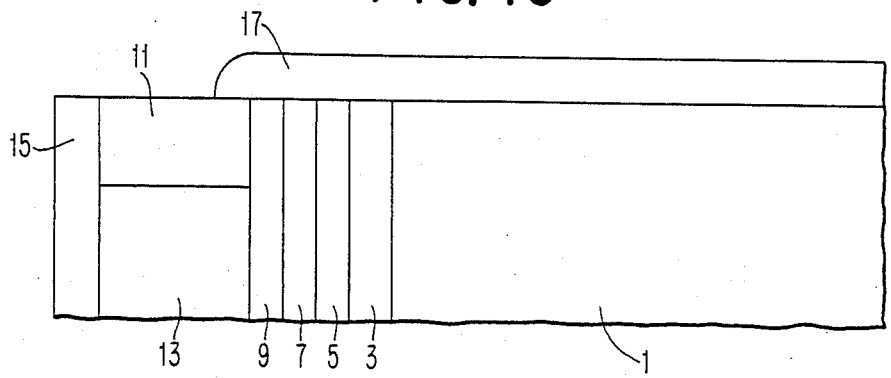

As shown in FIG. 9, the layer of aluminum oxide 17 is then sputter etched to expose the copper or gold studs 11. The resist is then stripped from the slider leaving the aluminum oxide layer 17 in the contour as shown in FIG. 10.

Figure 11:
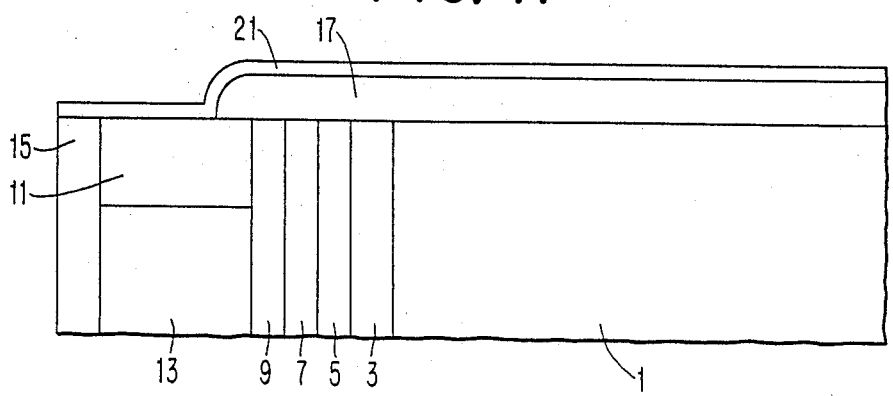
Figure 12:
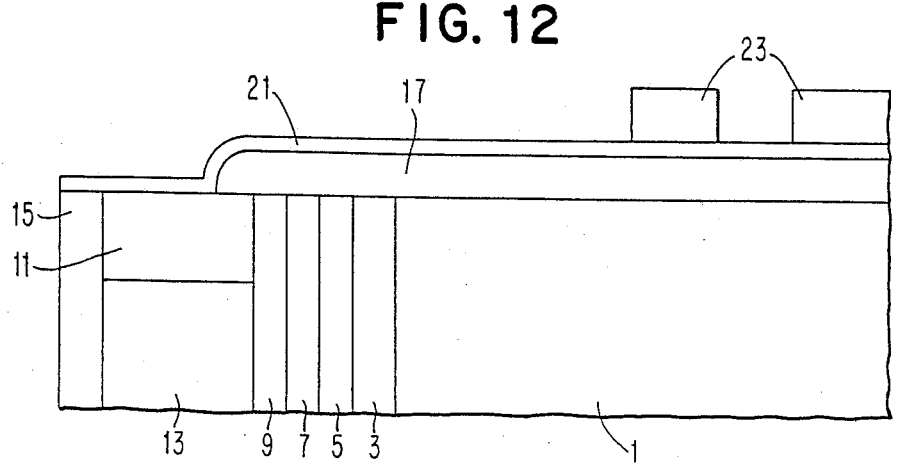

A thin Cr/Cu, Cr/Cu/Au, Ti/Cu, Ti/Cu/Au, or any other suitable appropriate solder limiting metallurgy layer 21 that would also serve in this application as a seed layer for subsequent plating operations is subsequently vacuum deposited on the $Al_2O_3$ layer 17 (FIG. 11). As shown in FIG. 12 a photoresist 23 is then spun, dried, exposed, and developed to form a desired metallization pattern on the slider back plane. This metallization pattern 25, serves to provide electrical contact to the cabling and/or to semiconductor chips, or any other structural attachments to the suspension arm and head/slider assembly.

Figure 13:
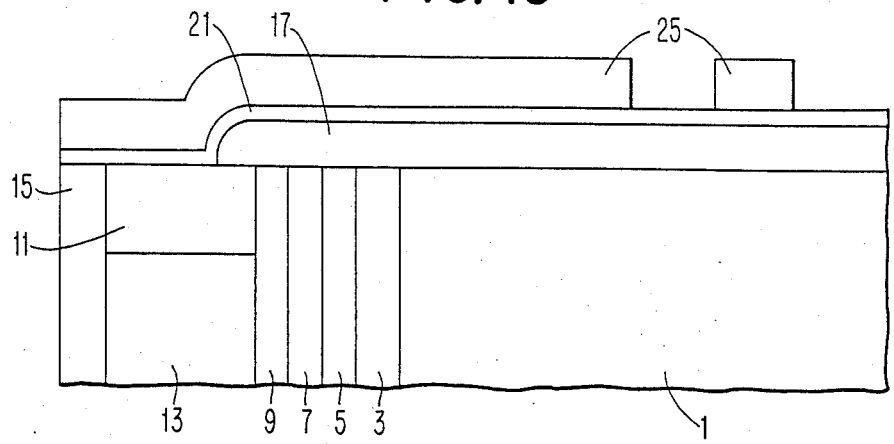
Figure 14:
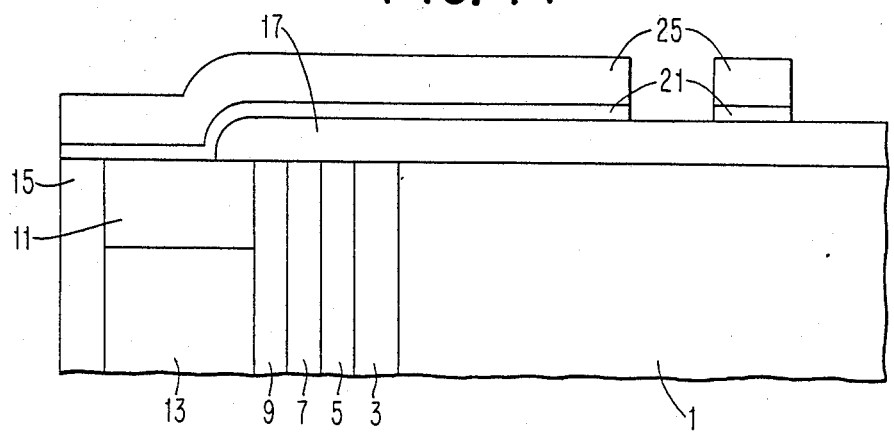
Figure 15:
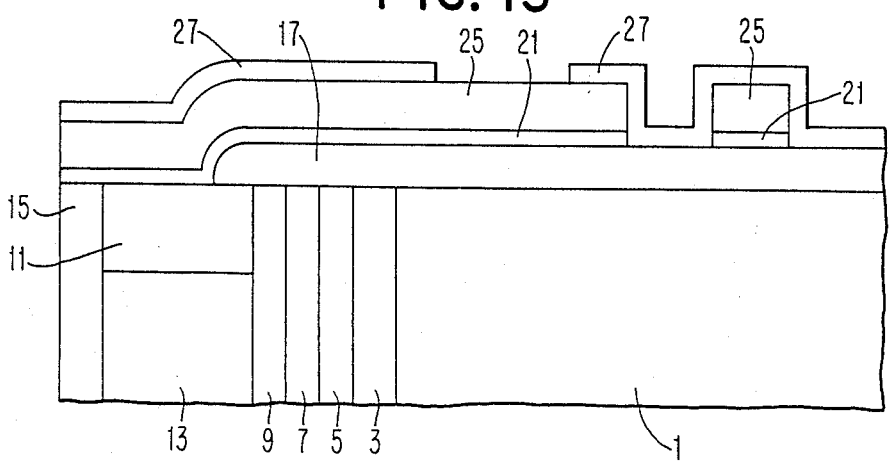

The metallization pattern comprises a thick Cu (preferred), Ni, or Au layer 25 which is plated through a mask or deposited by other suitable selective means onto the ($Al_2O_3$) layer 21 to the pattern of the photoresist 23 (FIG. 13). The photoresist 23 can be removed with acetone, by blanket exposure and development or by any other suitable means. The seed layer is then sputter-etched in argon (or argon and freon in the case of Ti-containing seed layer), to remove the seed layer 21 from those regions not coated with thick Cu (or Ni or Au) (FIG. 14). A solder mask 27 (photoresist, riston, aluminum oxide, glass, or other suitable dielectric material) is then applied, and patterned to contact areas for solder deposition. Mask 27 coats and protects all other areas of the back side of the slider (FIG. 15). Solder, or braze, is then deposited onto the exposed areas of FIG. 15.

Figure 17:
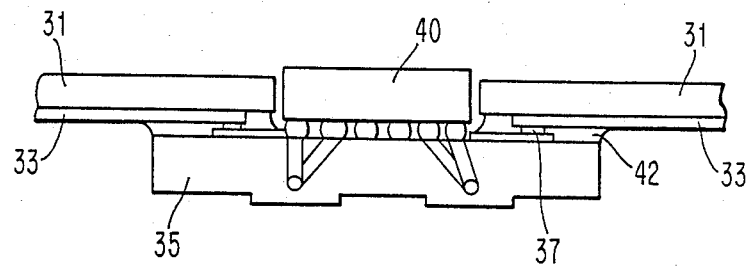
Figure 18:
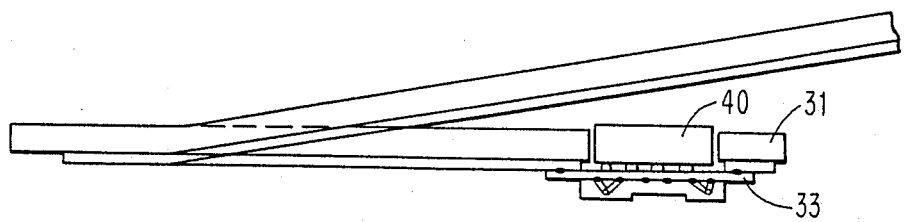

The head/slider, thus fabricated, can be assembled according to any of the embodiments of FIGS. 16–18, or combinations thereof. As discussed above, FIG. 16 is the most basic configuration of the embodiment with the slider 35 directly contact soldered onto the flat cable 33 which is laminated to the flexure 31.

FIG. 17 shows a different assembly of the suspension arm/slider/head assembly. In the FIGURE, the flexure 31 has now been split to accommodate the slider 35 mid-span. This relationship is necessitated by the particular method of accessing and recording data on the disks. Similarly, the flat cable 33 laminated to the flexure 31 has been separated to also span the slider 35.

Now, however, as can be seen in the FIGURE, a semiconductor chip 40 is soldered directly to and carried by slider 35. This joining of the slider to the semiconductor chip results in effective minimization of noise and eliminates the need for extension circuitry to accomplish the same. The slider 35 is then attached to each of its end by contact soldering or brazing 37 said slider to flat cable 33 to bring out the resultant signal from the transducer to the signal processor. Optionally, epoxy 42 can be added to increase the support of the contact soldering 37, if necessary or additional dummy solder pad connections can be made.

FIG. 18 shows another style of a suspension arm assembly incorporating the split flexure and cable design of FIG. 17.

Thus, while the invention has been described with reference to preferred embodiments thereof, it will be understood by those skilled in the art that various changes in form and details may be made without departing from the scope of the invention.

Having thus described our invention, what we claim as new, and desire to secure by Letters Patent is:

1. In a magnetic disk data storage system wherein a suspension arm supports and positions a thin film head/slider combination to specific tracks at particular radii on a magnetic disk and wherein said head/slider combination is electrically connected to external control circuitry, the improvement to said suspension arn and head/slider assembly comprising:
    (a) a head/slider combination having solder contact pads and an electrically conductive path formed on a top surface opposite to the surface intended to face a disk of said head/slider, the electrically conductive path providing electrical connection between the head and at least one of the solder contact pads, and
    (b) a cable wiring harness attached in a laminate relationship to said suspension arm said wiring harness being contact solder connected to said head/slider to thereby provide both mechanical support and electricl interconnection between the top surface of said head/slider and said cable wiring harness and suspension arm.

2. The suspension arm and head/slider assembly of claim 1 wherein a semiconductor device is soldered intermediately to said cable wiring harness and said head/slider combination.

3. The suspension arm and head/slider assembly of claim 1 wherein said suspension arm is a polyimide strip with electrical conductors deposited thereon.

* * * * *